United States Patent [19]
Geisselmann

[11] 3,777,257
[45] Dec. 4, 1973

[54] APPARATUS WITH CAPACITIVE PROBES FOR MEASURING THE LOCATION AND DISPOSITION OF AN INTERFACE BETWEEN TWO MEDIA

[75] Inventor: Heribert Geisselmann, Wohlen/Aargau, Switzerland

[73] Assignee: Camille Bauer Messinstruments Aktiengesellschaft, Wohlen/Aargau, Switzerland

[22] Filed: May 2, 1972

[21] Appl. No.: 249,634

[30] Foreign Application Priority Data
May 6, 1971    Switzerland.................... 6742/71

[52] U.S. Cl. ............................. 324/61 R, 73/304 C
[51] Int. Cl. ............................................ G01r 27/26
[58] Field of Search ..................... 324/61 R, 61 P; 73/304 C

[56] References Cited
UNITED STATES PATENTS

| | | | |
|---|---|---|---|
| 3,644,821 | 2/1972 | Long | 324/61 R |
| 3,343,415 | 9/1967 | Johnston | 73/304 C |
| 3,360,951 | 1/1968 | Hoenisch | 73/304 C X |
| 2,754,478 | 7/1956 | Goldsmith | 324/61 P |
| 3,181,557 | 5/1965 | Lannan, Jr. | 324/61 R X |
| 3,297,941 | 1/1967 | Wolfendale | 324/61 R X |
| 3,301,056 | 1/1967 | Blanchard et al. | 324/61 R X |
| 3,631,430 | 12/1971 | West | 324/61 R X |
| 3,665,209 | 5/1972 | Webb et al. | 324/61 R X |

Primary Examiner—Stanley T. Krawczewicz
Attorney—Ralf H. Siegemund

[57] ABSTRACT

Apparatus for measuring location and disposition of an interface between two media exhibiting a difference in dielectric constants or electric conductivity and including a column of pairs of capacitors arranged in a direction along which the location and disposition of the interface may vary, the media influencing the value of the capacitors. The capacitors of a pair having first common electrode configuration connected to an input line and second, individual, galvanically separated electrodes connected to a differential amplifier; electrical pulses are fed sequentially to the input lines and coupled to the differential amplifier through the pairs of capacitors. Imbalance on the differential amplifier output is referenced against pulse count reached when the imbalance occurs.

10 Claims, 2 Drawing Figures

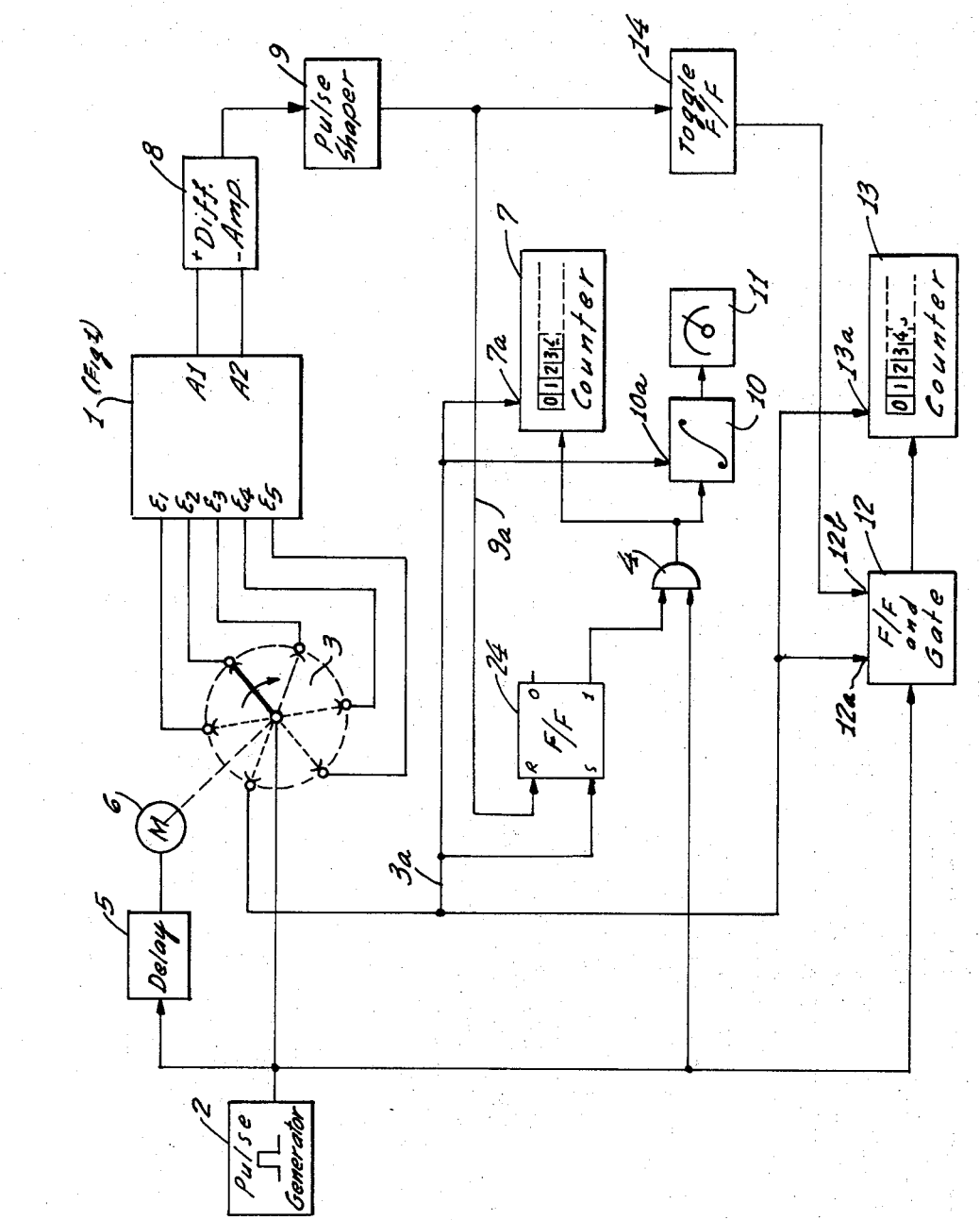

3,777,257

APPARATUS WITH CAPACITIVE PROBES FOR MEASURING THE LOCATION AND DISPOSITION OF AN INTERFACE BETWEEN TWO MEDIA

BACKGROUND OF THE INVENTION

The present invention relates to an apparatus for detecting and measuring the position and location of one or more interfaces between different media; more particularly, the invention relates to apparatus which is capacitively responsive to different dielectric constants of two media; the media itself may be different materials and/or they may appear in different phases. In other words, the invention includes detection of the interface between the gas and liquid phases or the interface between solid and gas phases or the interface between the liquid and solid phases of, possibly the same or different materials. The invention also includes the detection of the interface between the same phases of materials with different electric properties.

Capacitively measuring the location of an interface usually involves the response to the difference in capacitance of capacitors when one or the other material serves as dielectric between the respective capacitor electrodes. Capacitive probes of this type usually operate on basis of development of analog signals representing this difference in dielectric constants. However, these probes are dependent on the type, nature and condition of the material involved and on other relevant characteristics thereof including all materials with which the electrodes come into contact, or are within the effective range for influencing capacitance.

Also shape, type and other features of the container for the interface defining media are operative but undesirably variable parameters for the measuring process. As the detecting equipment is to operate as null instrument accurate compensation of all these parameters is needed. Drift and temperature dependency, possible deposition of impurities and other time variable factors complicate matters significantly.

DESCRIPTION OF THE INVENTION

It is an object of the present invention to provide an apparatus for capacitively measuring location and position of an interface between two media which operates independently from the material and physical characteristics of the media involved to the extent that, as much as possible any difference in electric constants of the media across the interface is the only operative parameter. The electric constants of the individual media, including possible variations for any reason, should not become operating parameters by themselves, including operative modifications thereof as resulting from the measuring vessel etc. Therefor, the apparatus in accordance with the invention should require compensation, trimming, adjustment etc. as little as possible.

In accordance with the preferred embodiment of the invention, the capacitive measuring apparatus is to include a capacitor column (d.c. separated from the medium by a layer of insulator) wherein respective two adjacent capacitors, being spaced-apart in direction and having displacement component transverse to the orientation of the interface to be detected, have one common (or common potential) electrode configuration and two individual and separated electrodes. The common electrode or electrodes of such a pair of capacitors receive pulses and the two individual electrodes feed to the two inputs of a differential amplifier.

The several electrodes are constructed so that these two capacitors feed similar inputs to the differential amplifier if the same medium acts as dielectric or conductor in both of them; if the interface separates them, the differential amplifier receives different inputs which is used as indication for the location of the interface. It can be seen that each pulse is a.c. coupled through the two capacitors of a pair to the two inputs of the differential amplifier, and different dielectrics or conductors in the two capacitors distort the otherwise similar signal coupling so as to imbalance the differential amplifier input.

Each pair of electrodes, as defined by and having a common input electrode configuration connects to a separate sample signal input line. There are as many input lines as there are pairs of capacitors. These sample signal input lines are scanned sequentially by pulses of a train, while alternating capacitors along the column and pertaining to different pairs, have their individual electrodes connected to the same input of the same differential amplifier. In other words, all pairs of capacitors have one electrode connected to one common pick-up electrode, and the respective other pick-up electrodes of all pairs are likewise interconnected for establishing a second common pick-up electrode, so that the pick-up electrodes of all pairs feed into the same two inputs of one differential amplifier. These two common pick-up electrodes have preferably comb-like configuration, and the input electrodes are disposed in-between the fingers of the combs.

Sequential pulses of the train are set sequentially (distributed) into the inputs corresponding to scanning the column of capacitors from one end to the other. The number of pulses is counted as long as the differential amplifier senses equality of inputs. The count number reached when signal inequality is sensed on the amplifier is indicative of the interface location.

It can also be seen that the invention combines digital and analog techniques in that basically digital pulses are used for acquisition purpose, but each pulse as an a.c. signals is "modulated" by the two capacitors of a pair and in the case of unequal modulation, the differential amplifier responds.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates the development of a cylindrical electrode pattern establishing the column of capacitors, e.g., the inner wall of a cylindrical sampling vessel; and FIG. 2 is a block diagram for digitally indicating the position of one or two interfaces between different media.

DESCRIPTION OF THE DRAWINGS

Proceeding now to the detailed description of the drawings.

Figure 1:
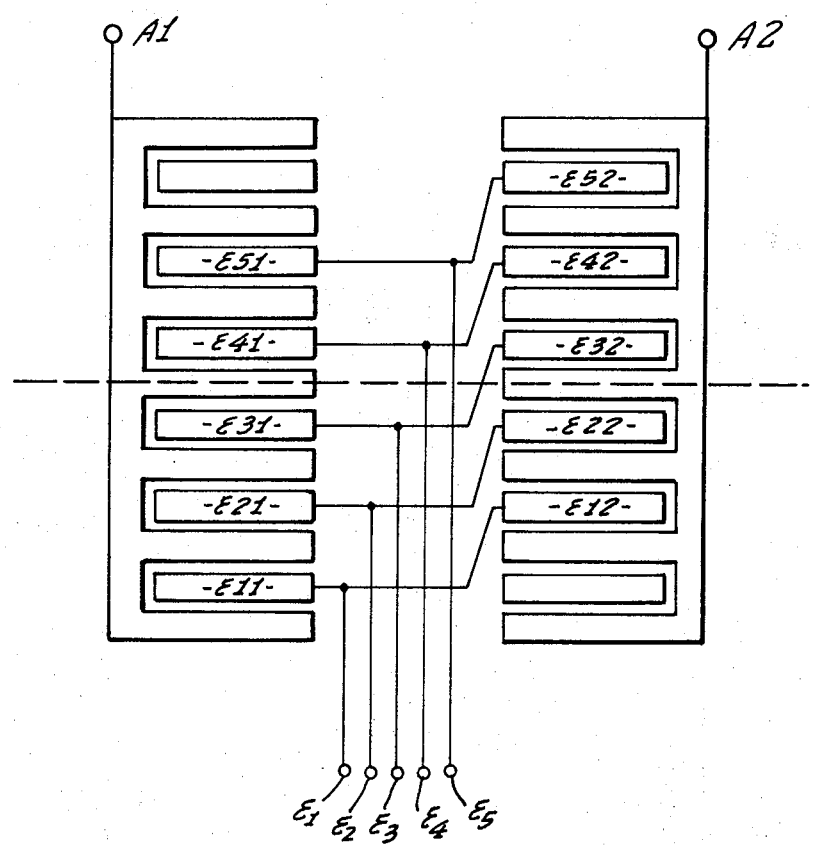
FIG. 1 illustrates, for example, the planar developed and projected interior surface of a cylindrical tube made of insulating material with copper plated electrodes. The figure could also be construed as a printed circuit foil made, for example, on a flexible base and to be used as lining in a sampling tube. In either case such container is presumed to hold two media, separated by an interface schematically represented by the dash line. Variations in the interface location occur transversely to that interface defining line. The electrode pattern as illustrated may additionally be covered by a lining, coating or hose (in the tubular configuration) made of a material commonly known as Teflon.

The electrode pattern includes two comb-like configurations, A1 and A2, having appropriately provided lead-in electrodes. These two electrodes are galvanically separated from each other. The combs face each other (in a plane) with the respective prongs or fingers, but at a phase shift of one of or more finger spacing. Additional electrodes are disposed in-between two fingers of each comb; electrodes E11, E21, — E51, are so disposed as to electrode A1, and there are provided electrodes E12, E22, —, E52, between the fingers of electrode A2. As a consequence, ten capacitors are defined; each of the electrodes Eij ($i = 1, —5; j = 1$ or 2) defines one capacitor together with the respective adjacent two fingers of electrode configuration A1 or A2 as the case may be. Effective capacitance is completed in each instance by the dielectric material closest to the respective electrodes.

Electrodes Eij are interconnected in pairs and that interconnection establishes a common electrode configuration. Thus, electrodes E11 and E12 form a first common configuration. They are interconnected by simple p.c. line, but could be of unitary construction. The other interconnected pairs are E21-E22; E31-E32; E41-E42 and E51-E52. These five interconnected electrodes respectively connect additionally to the five input lines E1, —, E5. Conceivably, these lines may be part of p.c. line configurations on the base. Accordingly, there are five pairs of capacitors, each pair having a common input electrode configuration for its two capacitors, Ei-Ei1-E12, $i = 1, —, 5$ and having additionally two output or pick-up electrodes defined by the respectively closest fingers of the electrode combs A1 and A2.

That there are five such capacitors is totally arbitrary, the number has been chosen for illustrative purposes only. The actual number used in any instance depends on the displacement range for the interface to be located and on the resolution of measurement. A multiple comb arrangement with appropriate staggering can also be provided.

The effective areas of the several electrodes have been chosen so that the capacity between any electrode Ei1 and the adjacent finger configuration of electrode A1 is the same as between the corresponding electrode Ei2 (of the same pair), and the adjacent finger configuration of electrode A2, provided the electrodes face the same electric coupling material (i.e., material of the same electric constant to be exact). In the illustrated, assumed case, E11-A1 and E12-A2; E21-A1 and E22-A2, are two pairs of capacitors of equal capacity. However, the capacitor E31-A1 has capacitance different from the capacitance of capacitor E32-A2, as the former is above and the latter is below the interface between two media and, thus, they have different electric coupling to $A_1$ respective to $A_2$. The capacitors E41-A1 and E42-A2 are again similar, so are the capacitors E51-A1 and E52-A2.

If now an a.c. signal is applied to line E1, pick-up electrodes A1 and A2 will develop similar signals. The same is true when the signal is applied to line E2. As the signal is applied to line E4 or E5, each of the pick-up and sampling electrodes A1 and A2 develops a signal that is different from before, but again they are similar among themselves, i.e., there is no difference in signal level on electrodes A1 and A2 in each of these cases. However, as the sampling signal is applied to line E3, the pick-up electrodes develop different signal levels. How this is being used will be explained next with reference to FIG. 2.

Reference numeral 1 in FIG. 2 refers to the electrode assembly and column as shown in FIG. 1 and may include the container having the interface to be located. Whatever the configuration, lines E1 to E5 denote the five inputs, and A1 and A2 are the outputs as derived from the pick-up electrodes of like designation.

A pulse generator 2 provides a train of pulses and feeds them to a common or central input of a signal distributor 3. The signal distributor 3 is shown as step switch, but could have electronic configuration (shift register with output gates or the like). Signal distributor 3 has six outputs, five of which are connected respectively to the input lines E1 to E5 of the capacitor column. The sixth output of distributor 3 (line 3a) connects to various circuits to be described below for marking completion of a scanning and sampling cycle and beginning of another one. Therefor, distributor 3 distributes pulses to lines E1 to E5 and in the sixth switching position a reset pulse is passed into the system.

The distributor 3, when constructed as step switch, is operated for stepping by a step motor 6. The motor 6 receives also the pulses from generator 2, but via a delay circuit 5. The circuit 5 delays each pulse from generator 2 by a period equal to about half the pulse rate period. Therefor, motor 6 receives a trigger or actuator pulse inbetween two sequential pulses as applied to distributor 3. The distributor will pass a pulse into one of its six output lines, and during the pause to the next pulse the distributor is stepped or shifted by one position, etc. Six pulses, thus, mark one complete measuring cycle for the system.

The individual pulses, thus, serve as a.c. input for each capacitor pair, and the capacitors of the pair serve as a.c.-coupler to the two inputs of a differential amplifier 8, which are connected to the two pick-up electrodes A1 and A2 accordingly. All pulses of the pulse train are fed to the clock input of a counter 7 via a gate 4. The gate 4 is under control of a flip-flop 24. The flip-flop is set when the distributor 3 passes a pulse into line 3a which is the cycle-completion pulse of the system, now setting up the system for a new sampling cycle. The same pulses in line 3a pass into the reset input 7a of counter 7, resetting it to zero count state for each new cycle.

Flip-flop 24 is reset by a pulse in a line 9a which connects to the output of a pulse shaper 9 receiving as input the output of differential amplifier 8. As long as flip-flop 24 is in the set state, gate 4 passes pulses from generator 2 to the counter 7 which tallies the pulses so applied. Once the flip-flop is reset by response of amplifier 8, gate 4 is blocked for the remainder of the cycle.

In operation, a cycle begins when distributor 3 sets a pulse from generator 2 into line 3a, setting flip-flop 24 for opening gate 4 and resetting counter 7 to count state zero. The same pulse as far as production by generator 2 is concerned, is delayed in 5 and operates motor 6 for shifting the distributor into the next position. Clockwise motion is presumed as indicated by the arrow. Thus, the next clock pulse is set into line E1. If the capacitors E11-A1 and E12-A2 (FIG. 1) are adjacent the same medium, two similar signals pass to the two inputs of amplifier 8 and no output is produced. Pulse shaper 9 may have a particular response level for noise suppression to compensate for any low level transients. Thus, a flip-flop reset pulse is not produced. As gate 4 is open, the same sample pulse passes and increments counter 7 by "one." Still the same pulse is delayed in 5 and soon causes distributor 3 to shift to the next position.

The next pulse passes into line E2, and in the illustrated representative example this pulse as applied to line E2, is effective in capacitors E21-A1 and E22-A2, which have also the same circumstances in this instance. Thus, differential amplifier 8 receives balanced inputs again, and pulse shaper 9 does not respond. The flip-flop 24 remains set, gate 4 remains open and counter 7 is duly incremented by "one" to count state "two." The same pulse as delayed shifts distributor 3 so that the next pulse from generator 2 passes to line E3 for the third capacitor pair in the column, but also, through still open gate 4 to counter 7 for the counter to assume count state "three." On the other hand, capacitor E31-A1 is exposed to a medium with electric properties different to the medium effective in capacitor E32-A2 as the interface is presumed to pass between them. Accordingly, this third sample pulse is picked up by electrodes A1 and A2 at different levels; the inputs of amplifier 8 do not balance and an output pulse is produced by shaper 9. A slight delay here may prevent a race condition so that flip-flop 24 is reset only after this pulse has passed through the gate 4. However, if flip-flop and counter operate on falling clock trigger, no problem exists and the pulse is still properly counted as the closing gate may produce the falling edge.

The next pulses pass through the system but closed gate 4 ignores them. The counter, thus, indicates the number of pulses, i.e., the number of steps for scanning the capacitor pairs of column 1 until the one pair was reached in which the interface served as divider to imbalance the characteristics of the capacitors of the pair. In the assumed example, it was the third pair and its location in the column represents directly the location of the interface.

Operation continues until the distributor 3 has completed a cycle whereupon the system resets to zero state and begins the next measuring cycle. The counter reset pulse at input 7a may be effective only in the counter proper as far as resetting is concerned. The counter proper may be a shift register, binary counter or the like. Unit 7 may include a hold section controlling directly an indicating portion (mechanical or nixie tubes etc.), and the counter reset pulse may serve as transfer control signal to the hold section for updating the content thereof. The hold section may be a register and the pulse at input 7a opens parallel gates between counter proper and register. Thus, the indicator portion of the counter will change only if in-between cycles there is a change in interface position. Otherwise the count state indicated is dynamically maintained. If the system is halted for any reason, the last indication may still remain.

In case the interface position is to be indicated as analog value, an integrator 10 may be connected to the output of gate 4 for integrating the pulses passing through and now presumed to have constant amplitude and duration (or at least constant time voltage integral). The pulse in line 3a is applied to a reset input 10a of the integrator to reset the integrator with the beginning of each cycle. An instrument 11 is connected to the output of the integrator 10. A hold circuit may be interposed unless the response time of indicator 11 is slower than the cycle rate of the distributor 3.

It can be seen that the indicator for the location and disposition of an interface relates directly to the disposition of the several pairs of capacitors. There is no inherent necessity that these locations bear any spatial relation to each other. Each number may be interpreted as a location identification number for the interface to be detected. However, the system can be used as direct indication of interface position on a linear scale, in which case the pairs of capacitors must be regularly spaced. In a different version, the system may, for example, be used to indicate the filling state in a container of irregular volume contour, for example, a cylindrical container or tank lying down. The surface level height therein is not linearly related to volume, but by irregularly spacing the capacitors, e.g. on one inside front end of the container with denser spacing in the middle than near top and bottom, such scale distortion can be made to compensate the non-linear relation between level height and volume.

Some of the elements shown in FIG. 2 have not yet been explained. They relate to the fact that the system as explained thus far, can be supplemented by circuitry for detecting the locations of more than one interface, e.g., in a multi strata configuration of several media.

Reference numeral 12 refers to another gate and flip-flop circuit assembly equivalent to elements 4 and 24 above. The gate in circuit 12 receives also the pulses from generator 2 and passes them to a counter 13 unless inhibited. The reset input 13a of this counter receives the cycle pulse in line 3a, and still the same signal sets the flip flop in circuit 12 via input 12a thereof.

The output of pulse shaper 9 operates a toggle flip-flop 14. It can be seen that for two-interfaces the second response of differential amplifier 8 is indicative of the location of the second interface. Toggle flip-flop 14 suppresses the first response and only the second response is used to reset the flip-flop in gating circuit 12 via input 12b thereof. Therefor, counter 7 is halted for the first interface and counter 13 for the second interface, and the respective count numbers represent their locations. That the flip-flop 24 receives a second reset input on detection of the second interface does not influence the circuit. Additional counter-gate assemblies can be added with another counter to be used for counting the number of responses of differential amplifier 8, so that the several counters are halted in proper sequence, each representing the location of one interface. Also, analog indication of the type 10–11 can be used in addition or in lieu of digital counting in each case.

The invention is not limited to the embodiments described above but all changes and modifications thereof not constituting departures from the spirit and scope of the invention are intended to be included.

I claim:

1. Apparatus for measuring location and disposition of an interface between two media exhibiting a difference in electric constants and including a column of capacitors arranged in a direction along which the location and disposition of the interface may vary, the electric properties of the media influence the capacitors of the column, the improvement comprising:

the capacitors of the column arranged in pairs, the capacitors of a pair spaced-apart in said direction;

the capacitors of a pair having a first electrode for a first capacitor of the pair, a second electrode for a second capacitor of the pair and a third electrode configuration being the respective counter electrode for both capacitors of the pair, the first and second electrodes and the third of the pair all being galvanically separated from each other, the first, second and third electrodes of each capacitor pair being stationary relative to each other, the third common potential electrode configurations of all pairs being galvanically separated from each other;

a plurality of input lines respectively connected to the third electrode configuration in the pairs;

first means for feeding sequentially pulses to the input lines of the plurality to be sequentially effective in the pairs of capacitors, each pulse effective in both capacitors of a pair;

second means including two output lines respectively connected to the second individual electrodes of each pair for establishing two pick-up electrode configurations, whereby all of the first electrodes of respectively all first capacitors are interconnected and connected to one of the two output lines, and all the other second electrodes respectively of all the second capacitors are interconnected and connected to the other one of the two output lines;

a single differential amplifier having two inputs connected respectively to the two output lines; and third means connected to the first means and to the differential amplifier for deriving therefrom representation of the interface location and disposition in relation to the capacitor column.

2. Apparatus as in claim 1, wherein the first means includes a pulse generator and a pulse distributor feeding the pulses from the generator sequentially into the input lines of the plurality.

3. Apparatus as in claim 2, wherein the third means includes a counter connected for counting pulses from the pulse generator, further connected to halt counting when the differential amplifier senses different inputs as applied by the two output lines.

4. Apparatus as in claim 3, wherein the pulse distributor operates cyclically and means are provided for restarting the counting operation for each distribution cycle.

5. Apparatus as in claim 2, wherein the third means includes an integrator connected for integrating pulses from the generator until the differential amplifier senses different inputs as applied by the two output lines.

6. Apparatus as in claim 2, wherein the third means is responsive to plural sequential responses of the differential amplifier to inequality of inputs on the two output lines and provides for separate manifestations representing location and disposition of different interfaces.

7. Apparatus as in claim 1, wherein the several electrodes are provided as printed circuit platings on an insulative backing.

8. Apparatus as in claim 7, wherein the printed circuit platings are covered by an insulative layer.

9. Apparatus as in claim 7, wherein the backing has tubular configuration.

10. Apparatus as in claim 1, wherein the first and second electrodes of the pair and including the second means are provided by two comb-like electrode configuration having fingers, and electrodes pertaining to the first common electrode configuration are disposed between the fingers.

* * * * *